United States Patent
Klepzig (10) Patent No.: US 12,137,834 B2
(45) Date of Patent: *Nov. 12, 2024

(54) MILK DELIVERY APPARATUS FOR A FULLY AUTOMATIC COFFEE MACHINE AND CORRESPONDING PROCESS

(71) Applicant: Jura Elektroapparate AG, Niederbuchsiten (CH)

(72) Inventor: Sandro Klepzig, Teufenthal (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 137 days.

This patent is subject to a terminal disclaimer.

(21) Appl. No.: 17/253,386

(22) PCT Filed: Feb. 14, 2020

(86) PCT No.: PCT/EP2020/053972
§ 371 (c)(1),
(2) Date: Dec. 17, 2020

(87) PCT Pub. No.: WO2021/032322
PCT Pub. Date: Feb. 25, 2021

(65) Prior Publication Data
US 2022/0167779 A1    Jun. 2, 2022

(30) Foreign Application Priority Data
Aug. 22, 2019 (EP) .................................. 19193186

(51) Int. Cl.
*A47J 31/44* (2006.01)
*B01F 23/232* (2022.01)
(Continued)

(52) U.S. Cl.
CPC ....... *A47J 31/4485* (2013.01); *B01F 23/2323* (2022.01); *B01F 25/31242* (2022.01); *B01F 2101/07* (2022.01)

(58) Field of Classification Search
CPC .... A47J 31/58; A47J 31/4425; A47J 31/4489; A47J 31/4407; A47J 31/4403;
(Continued)

(56) References Cited

U.S. PATENT DOCUMENTS

| 4,949,631 | A | 8/1990 | Fregnan |
| 10,537,205 | B2 | 1/2020 | Locher |
| 2017/0238755 | A1* | 8/2017 | Locher ................ A47J 31/4485 |

FOREIGN PATENT DOCUMENTS

| EP | 2540200 | 1/2013 |
| EP | 3210505 | 8/2017 |

(Continued)

OTHER PUBLICATIONS

EP254200A1 translation, originally published Jan. 2, 2013, retrieved from espacenet Aug. 29, 2023 (Year: 2013).*

*Primary Examiner* — Phuong T Nguyen
(74) *Attorney, Agent, or Firm* — Volpe Koenig (57) ABSTRACT

For a milk delivery device (1) which delivers milk (7) on the basis of the Venturi effect with the aid of a steam flow (9) output from a steam nozzle (2), it is provided, by corresponding orientation of an admixing opening (4) and optionally with the aid of deflecting surfaces (46), to allow a milk flow (8) sucked up by the steam flow (9) to flow tangentially onto the steam flow (9) in order thereby to be able to still ensure that the milk flow (8) is delivered in a manner as free as possible from disturbances, even in the event of very low flow rates of the milk flow (8). For this purpose, even before the milk flow (8) enters into contact with the steam flow (9), the milk flow (8) is oriented in the direction (51) of the steam flow (9).

19 Claims, 5 Drawing Sheets (51) Int. Cl.
    *B01F 25/312*    (2022.01)
    *B01F 101/07*    (2022.01)

(58) Field of Classification Search
    CPC ...... A47J 31/4485; A47J 31/44; A47J 31/002;
               A47J 31/46; A47J 31/36; B01F 25/31242;
                       B01F 23/2323; B01F 2101/07
    USPC ......... 99/280, 281, 282, 283, 293, 295, 325,
                                     99/357, 453
    See application file for complete search history.

(56) References Cited

FOREIGN PATENT DOCUMENTS

| | | |
|---|---|---|
| FR | 2638083 | 10/1989 |
| RU | 2389425 | 5/2010 |

\* cited by examiner

MILK DELIVERY APPARATUS FOR A FULLY AUTOMATIC COFFEE MACHINE AND CORRESPONDING PROCESS

TECHNICAL FIELD

The invention relates to a milk delivery device having a steam nozzle for generating a steam flow, and a mixing chamber adjoining a steam outlet opening of the steam nozzle, wherein the milk is guided at an entry point into the mixing chamber, wherein the entry point is upstream with respect to a direction of the steam flow of the steam outlet opening. Such a milk delivery device can be used in particular in a fully automatic coffee machine in order to deliver milk for coffee beverages. Furthermore, such a milk delivery device can also be used as a milk-frothing device in order to produce and to deliver milk froth.

Furthermore, the invention relates to an associated method for delivering milk, in particular in the form of milk froth, with the aid of a steam flow generated by a steam nozzle, wherein the milk is delivered on the basis of the Venturi effect.

BACKGROUND

Many coffee machines, in particular fully automatic coffee machines, have a milk delivery device, as described at the beginning, for preparing coffee specialities with milk. Since pumps are expensive, recourse is made here to the Venturi principle for delivering the milk: in this connection, a negative pressure is generated with the aid of said steam nozzle in order to suck up milk out of a container or the like, wherein the steam is mixed with the milk in said mixing chamber to form a steam and milk mixture.

The Venturi effect is based here on the fact that, when a flow cross section of the steam nozzle is constricted, the speed of the steam flow necessarily increases, which leads to a drop in the pressure. These relationships are described by the known Bernoulli equation. If the speed of the steam flow is increased, the pressure drops below ambient pressure and negative pressure thus arises. Another fluid, i.e. for example milk, or even solids, can then be drawn in by means of said negative pressure.

Depending on whether milk or milk froth is intended to be provided with the delivery device, air can in addition still be supplied to the steam and milk mixture in order to obtain milk froth. If milk froth is delivered, the quality of the milk froth is typically endeavoured to have pores which are as fine as possible.

EP 2 540 200 A1 relates to a milk-frothing unit which is likewise based on the Venturi effect. In this case, the milk flow line or milk and air flow line forms part of the mixing chamber. Furthermore, the milk flow line or milk and air flow line is constructed here according to the counterflow principle—i.e. has changes of direction of virtually 180 degrees. As a result, switchbacks are formed which may have a particular tendency to deposit contaminants due to milk being stationary.

FR 2 638 083 A relates to a milk-frothing unit, in which the milk line is not delimited from the mixing chamber by a structurally defined entry point.

In the case of previously known milk delivery devices, it is frequently not optimum for an outlet jet of the milk or of the milk froth from the device not to be compact. This is frequently because the realization of the Venturi principle is pushed to its physical limits. This is true in particular whenever—for example in order to generate a high temperature of the milk or of the milk froth—the milk is delivered only at a very low delivery rate, with a constant flow rate of the steam flow. Accordingly, at very low flow rates of the milk, pulsing of the delivered milk flow or even an abrupt breaking off of same is frequently to be observed.

SUMMARY

Starting from these observations, it is an object of the invention to provide a milk delivery device or an associated method still permitting a stable delivery even at very low flow rates.

In order to achieve this object, in the case of a milk delivery device, one or more features as described herein are provided. In particular, in order to achieve the object in the case of a milk delivery device of the type mentioned at the beginning, it is thus proposed according to the invention that the entry point is formed by means of a constriction. The constriction can form a structural boundary of the mixing chamber such that flowing back of steam and/or of a steam and milk mixture out of the mixing chamber into the milk line can be better prevented.

In other words, it is accordingly proposed that the milk enters the mixing chamber in such a manner that the milk covers a distance in the direction of the steam flow or along the latter before being combined with the steam flow. Since the milk typically passes as a milk flow into the mixing chamber, a section can thus be provided within the mixing chamber, in which the milk flow flows in the same direction as the steam flow before the milk flow is combined with the steam flow to form a milk and steam flow.

Figure 3:
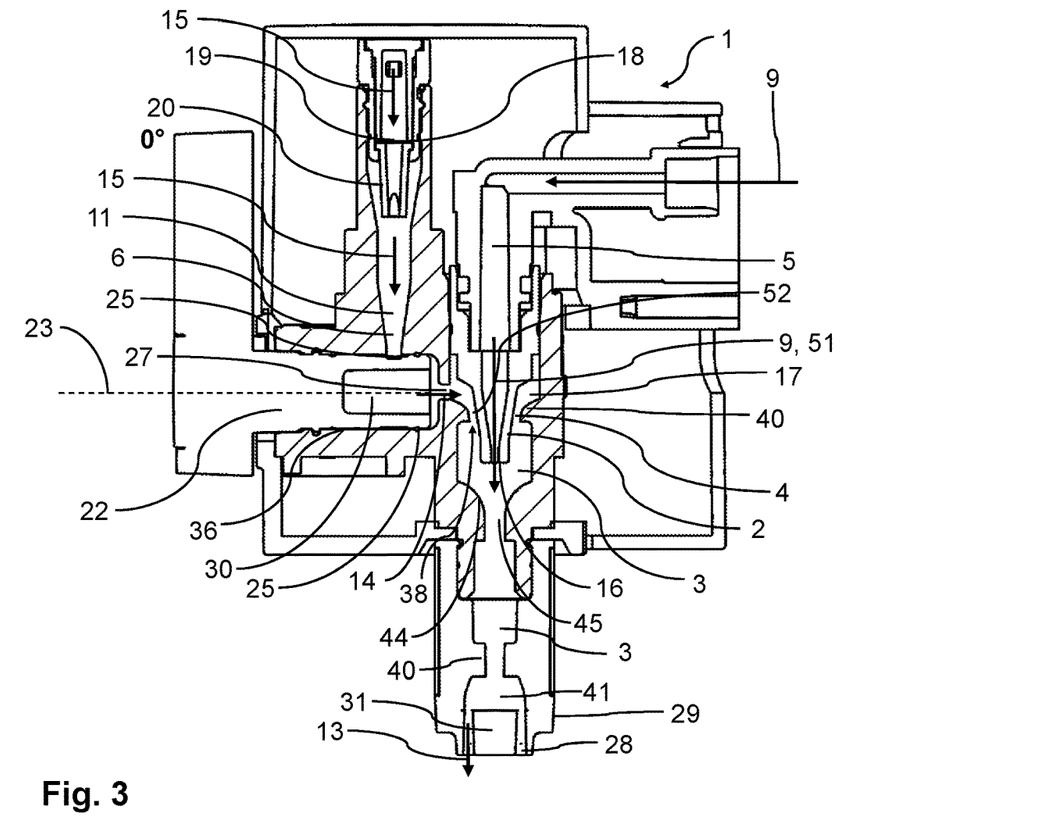
FIG. 3 shows a top view of the longitudinal section according to FIG. 2.
Figure 4:
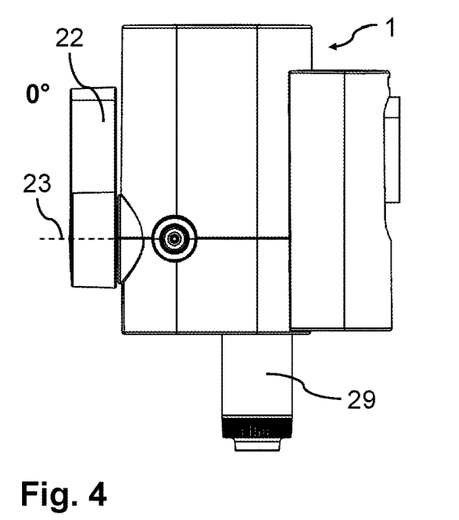
FIG. 4 shows a side view of the milk delivery device from FIG. 1.
Figure 5:
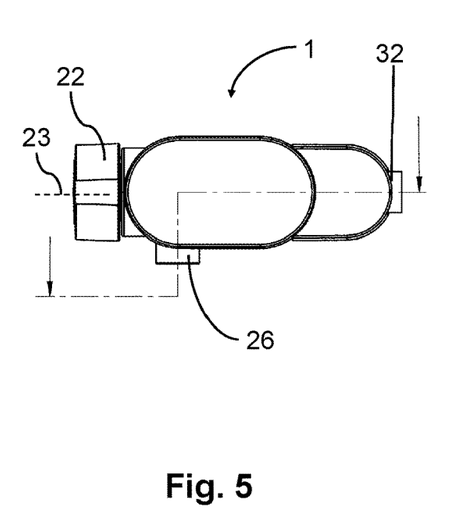
FIG. 5 shows a view from above of the milk delivery device from FIG. 1.

Accordingly, shifting forward of the entry point can be understood as meaning in particular an arrangement in which the entry point, counter to a direction of the steam flow in a steam outlet opening of the steam nozzle, is arranged spaced apart from the steam outlet opening (cf. in this respect FIG. 3). In such an arrangement, the entry point is accordingly shifted back with respect to the steam outlet opening and the steam flow.

An advantage of all of these refinements is that a flow direction of the milk flow can be oriented in the direction of the steam flow before the milk flow is combined with the steam flow. Unlike in the case of previously known devices, the milk flow thus no longer impinges on the milk flow at a more or less large angle, in particular right angle, but rather the milk flow is deposited tangentially on the steam flow and is conveyed uniformly here by the steam flow.

It can be observed as a result that, with the solution according to the invention, a milk jet or milk froth jet delivered with the device emerges much more gently from the mixing chamber, this being in particular acoustically perceptible. This uniform flowing out due to a continuous delivery rate can be maintained here even at very low delivery rates, because of the more stable realization of the Venturi principle by the novel arrangement of the entry point and the associated novel feeding of the milk flow to the steam flow conveying the latter.

The advantages of the solution according to the invention can be increased further by means of embodiments which are described in the dependent claims.

Thus, for example, an admixing opening for milk or else for milk and air can be provided, said admixing opening defining the entry point and opening into the mixing chamber. This admixing opening can now be oriented rectilinearly and/or shaped in such a manner that the milk is fed as a milk flow in the direction of the steam flow to the steam flow. This feeding can be configured in particular in such a manner that, in a region in which the milk flow makes contact with the steam flow and/or is combined with the steam flow, a flow direction of the milk flow runs tangentially with respect to a flow direction of the steam flow. In this case, after milk and steam are combined, the flow direction of the milk flow can precisely coincide with that of the steam flow, in particular in such a manner that milk and steam flow further in the form of a joint milk and steam flow.

The feeding can furthermore preferably be configured in such a manner that, in a region of the mixing chamber upstream of the steam outlet opening, the milk flow flows in the direction of the steam flow, in particular along an outer surface of the steam nozzle. This is possible, for example, if a steam outlet opening of the steam nozzle and said admixing opening point in the same direction. For this purpose, the admixing opening can preferably be formed annularly and/or arranged concentrically with respect to the steam nozzle. Furthermore, it is advantageous if the admixing opening is upstream of the steam outlet opening. The effect which can be achieved by such configurations is in particular that the steam flow emerging from the steam outlet opening is encased annularly by a casing flow of milk or of milk and air flowing in the direction of the steam flow, which has the result of delivering milk particularly uniformly into the mixing chamber.

According to a further preferred refinement, an outer surface of the steam nozzle can bound the entry point, that is to say in particular said admixing opening, at least in sections. This is possible, for example, if the admixing opening is arranged annularly around the steam nozzle.

The constriction can separate an intake chamber upstream of the mixing chamber from the mixing chamber. Such an intake chamber is advantageous in order to orient the milk flow prior to entry into the mixing chamber. Furthermore, the intake chamber can also be used to mix milk with air to form a milk and air flow which can then pass through the admixing opening into the mixing chamber.

It can be particularly advantageous if the constriction is formed by a constriction section having a constant opening cross section. In particular, the constriction section can have a constant opening cross section in sections, in particular over an entire length of the constriction section. An even better structural boundary of the mixing chamber in relation to the milk line can thus be set up. Particularly good admixing of the milk to the steam is thus possible.

The intake chamber can also annularly surround the steam nozzle, which is advantageous in particular when an annular admixing opening is used.

It is very particularly advantageous if the intake chamber and/or the steam nozzle have/has a deflecting surface for deflecting the milk flow in the direction of the steam flow. This is because, with such a deflecting surface, it is possible to orient a milk flow, which initially runs at an angle, in particular right angle, to the steam flow, in the direction of the steam flow.

The deflection of the milk flow by means of one or more deflecting surfaces can be configured in particular in such a manner that the milk flow already passes through the admixing opening in the direction of the steam flow, which results in a particularly gentle delivery of milk.

In order better to be able to avoid deposits of contaminants caused by stationary milk within the milk line, it can be provided that a flow guide of a milk flow or of a milk and air flow upstream of the entry point has a maximum change in direction of at most 120 degrees, in particular of at most 90 degrees. Alternatively or in addition, it can be provided that the flow guide is free of switchbacks.

According to one specific refinement, it is furthermore advantageous, for a uniform delivery rate, if a distance between the entry point and the steam outlet opening is greater than a clear diameter of the steam outlet opening and/or than a clear width of the admixing opening and/or than an outer diameter of the steam nozzle at the location of the steam outlet opening. It is in each case ensured by means of such configurations that the milk flow is combined with the steam flow without relatively great turbulence, as may arise during passage through the admixing opening, and therefore the milk and steam flow which arises is delivered uniformly.

If milk froth is intended to be delivered by the milk delivery device, an atomization chamber downstream of the mixing chamber in the steam flow direction can be formed, in particular as part of the mixing chamber. This atomization chamber which serves for producing an aerosol of milk and air, i.e. milk froth, can be separated from the mixing chamber preferably by means of a constriction. Furthermore, the atomization chamber can have an impact body for atomizing milk. This impact body can form a planar surface which is oriented at a right angle to the steam and milk flow.

In order to permit the production of milk froth with pores which are as fine as possible, the milk delivery device, between the mixing chamber and the atomization chamber, can form an acceleration section for accelerating a steam and milk mixture.

For a uniform delivery rate of the milk flow or of the milk and steam flow, it is furthermore crucial for the milk to be mixed with the steam without relatively great turbulence. For this purpose, it is proposed that the mixing chamber has a collecting funnel which collects and combines the steam flow and milk flow. This collecting funnel is preferably aligned with the steam outlet opening, in particular in such a manner that an axis of rotation of the collecting funnel coincides with a steam outlet direction. Furthermore, it is advantageous if the steam funnel is constricted in the steam flow direction. The steam funnel can furthermore open into said acceleration section.

As has already been mentioned, the milk delivery device can be configured in particular in the form of a milk-frothing device or can be used as such. For this purpose, a milk flow which is delivered by the milk delivery device and flows into the mixing chamber at the entry point can still be adjustable upstream of the entry point by means of a variable opening cross section, as will be explained in more detail further below.

If milk froth is intended to be delivered, the milk delivery device or the milk-frothing device can have an air supply. This air supply can be configured in such a manner that, in particular at the same time as the milk flow, an air flow can be conducted through the variable opening cross section. Therefore, in particular a milk and air flow can thus be guided into the mixing chamber at the entry point.

Accordingly, in other words, the milk flow can have an air portion and can thus pass as a milk and air flow into the mixing chamber. As a result, in particular a steam and milk and air mixture can therefore arise in the mixing chamber. And then, from the steam and milk and air mixture, a milk froth can be generated by corresponding turbulence swirling in said atomization chamber.

With the variable opening cross section through which the air and the milk can flow as a milk and air flow, a flow rate of the milk and air flow can be adjusted. The ratio between air and milk can be maintained here since the milk entrains the air as it flows through the opening cross section. As a result, the milk flow can no longer be broken off—as can frequently be observed previously in the prior art, and this is of great advantage for a continuous delivery rate of the milk.

In order to achieve the object mentioned, the features of the independent method claim are also provided according to the invention. In particular, in order to achieve the object in the case of a method for delivering milk of the type described at the beginning, it is thus proposed according to the invention that the milk is oriented as a milk flow along the steam flow.

In the case of this method according to the invention, it is particularly advantageous, for the generation of as uniform a delivery of milk as possible, even at very low flow rates, if a milk delivery device according to the invention, in particular as described previously or according to one of the claims directed towards a milk delivery device, is used.

According thereto, in particular as an alternative to the orientation of the milk flow, it can preferably, however, additionally be provided that the milk is guided into the mixing chamber at an entry point which is upstream of a steam outlet opening of said steam nozzle—with respect to a direction of the steam flow. The longitudinal direction or flow direction of the steam flow can preferably be defined here by the steam outlet opening of the steam nozzle.

Such a method according to the invention realizes all of the advantages described previously with respect to the device according to the invention, in particular a uniform delivery of the milk even at very low delivery rates of the milk.

It is very particularly advantageous for an efficient and as gentle a delivery of milk as possible, i.e. free from disturbances, on the basis of the Venturi principle if the milk flow is oriented in the direction of the steam flow, even before the steam flow is combined with the milk in a mixing chamber. This mixing chamber, in particular as already described previously, can adjoin a steam outlet opening of the steam nozzle. Combining can be understood here as meaning the point at which the milk flow and the steam flow come into contact and are combined to form a joint milk and steam flow, with it not yet being necessary for turbulent mixing of the milk with the steam to have to take place; on the contrary, this can take place first in a downstream atomization chamber.

Such a guide of the milk flow can be particularly simply obtained with the aid of an admixing opening which is upstream of a steam outlet opening of the steam nozzle. This admixing opening can be configured as already described previously and can be oriented in particular in the direction of the steam flow output by the steam nozzle. By means of the above measures, the milk flow can be guided in particular in such a manner that the milk flow already flows in the direction of the steam flow when said milk flow flows into the mixing chamber, in particular through said admixing opening.

Such a milk flow can be produced, for example, when the milk flow is oriented by means of at least one deflecting surface in an intake chamber upstream of the mixing chamber.

Furthermore, it is advantageous for an efficient conveying of the milk flow, even at low delivery rates, if the milk flow flows into said mixing chamber concentrically with respect to the steam nozzle.

This can be achieved, for example, if the milk flow in a region that is upstream of a steam outlet opening of the steam nozzle flows in the direction of the steam flow along an outer surface of the steam nozzle.

In order to obtain structural advantages, for example in order to optimally use space in a fully automatic coffee machine, it may be advantageous if the milk flow flows into the previously explained intake chamber transversely with respect to the direction of the steam flow. The milk flow can subsequently then be deflected by 90° by means of the deflecting surfaces in order to align the milk flow with the steam flow.

In order still to avoid turbulent flows in the region of the steam nozzle, it can be provided according to the invention that the milk flow is combined with the steam flow in the mixing chamber by means of a collecting funnel. The collecting funnel can preferably be rotationally symmetrical here and/or can be oriented with respect to a steam outlet opening of the steam nozzle.

In all of the previously explained embodiments, it can also be provided that the milk flow has an air portion for forming a steam and milk and air mixture. This air portion can be admixed to the milk flow in the form of an air flow, specifically even before the milk and air flow thus arising passes into the mixing chamber, in order to be mixed there with the steam flow to form a steam and milk and air mixture.

Specifically when hot milk froth is intended to be produced, it is particularly advantageous if said air portion is conducted as an air flow together with the milk flow as a milk and air flow through a variable opening cross section even before the milk and air flow passes into the mixing chamber. The advantages of such a procedure consist in that the air flow can no longer get out of control, and therefore, even at low delivery rates, a desired ratio of air to milk can always be maintained, and this has already been explained with reference to the device according to the invention and will also be explained once again with reference to the figures.

Further refinements moreover comprise yet further innovative aspects and relate in this respect to a milk delivery device which can be used as a milk-frothing device, having a steam nozzle and a mixing chamber adjoining the steam nozzle, for producing milk froth from steam, milk and air, wherein a milk flow passing into the mixing chamber is adjustable by means of a variable opening cross section. This milk delivery device or milk-frothing device for producing milk froth can be configured in particular as described previously.

Further refinements furthermore relate to a method for producing milk froth with the aid of a milk delivery device or milk-frothing device, in particular as described here, wherein air and milk are frothed in a mixing chamber by means of a steam flow to form the milk froth, and wherein a milk flow passing into the mixing chamber is adjusted by means of a variable opening cross section. This method can in particular comprise method steps of the previously explained method for delivering milk.

Such devices and methods are likewise already known and are used in particular in fully automatic coffee machines in order to fully automatically produce milk froth for coffee beverages. The milk froth is typically intended to have pores which are as fine as possible.

The user of the fully automatic coffee machine can often in addition also adjust the temperature of the milk froth by adjusting said milk flow, from which the milk froth is produced by mixing with air, such that, in a ratio to a quantity of milk to be frothed, more or less hot steam is available per unit of time for heating the milk froth. The temperature of the milk froth is typically increased the less the milk flow is adjusted, i.e. the greater the milk flow is throttled.

However, with this approach, the temperature of the milk froth cannot be increased as desired. This is because it can typically be observed that the fine porosity of the milk froth decreases as the temperature increases, i.e. as the flow rate of the milk flow decreases, which is undesirable. The fine porosity of the milk froth can therefore typically be maintained only up to temperatures of 40-50° C.

In addition, a frequent problem is that the milk flow begins to pulsate at too low a flow rate (i.e. too low a milk flow), or breaks off entirely, which then results in an undesirable holding up or non-uniform flowing out of the milk froth.

In order to avoid the aforementioned disadvantages, it is proposed that the air is guided as an air flow through the variable opening cross section into the mixing chamber.

The variable opening cross section can act here as a throttle with which a flow rate both of the milk flow (as previously customary), but also a flow rate of the air flow can be regulated. Unlike in the case of previously known milk-frothing devices, the air flow is therefore no longer independent of the milk flow, but rather a flow rate of the air flow is dependent on a flow rate of the milk flow. The air flow is automatically reduced here as soon as the milk flow is reduced by reduction of the variable opening cross section.

It can thereby be ensured that the air flow does not gain the upper hand (as in the case of previously known milk-frothing devices), and the milk flow abruptly decreases at the expense of the air flow, or even entirely breaks off because the air admixing ratio has become too great. Accordingly, pulsation or non-uniform flowing out of the milk froth from the milk-frothing device can be avoided.

One possible alternative to this could consist in an active throttling or regulating of the air flow by means of a separate air-flow-regulating valve or the like, specifically in the event that the milk flow decreases or is actively reduced, for example by a user of the milk-frothing device.

The use of the variable opening cross section as previously described has the advantage of proposing a particularly simple refinement with which the air flow can be automatically adapted—without additional active regulating components, such as controllable valves or the like, as soon as the milk flow is changed with the aid of the variable opening cross section. In more precise terms, by the use of such a variable opening cross section, the air flow can be automatically reduced as soon as the milk flow is reduced.

A cause for this could be that the air together with the milk forms a common fluidic boundary surface when the air together with the milk flows through the variable opening cross section. It is thereby made impossible in flow situations, as are required for producing milk froth, for the milk flow to break off entirely. In previous solutions which provide separate channels for air and milk that are brought together only shortly upstream of, or in, the mixing chamber, it is by contrast entirely possible for the milk flow to break off entirely because the air flow gains the upper hand and floods the entire mixing chamber.

As a result, with the previously explained variable opening cross section, even if the milk flow is adjusted to be very low (for example in order to obtain a correspondingly high milk froth temperature), it can thus be ensured by a correspondingly great reduction in the opening cross section that the air flow is sufficiently greatly throttled. This makes it possible for fine-pored milk froth to be produced with the milk-frothing device according to the invention, even at temperatures above 50° C. If the milk flow is minimized, milk froth temperatures of up to 75° C. can be obtained, wherein fine-pored, creamy milk froth can be obtained even at these high temperatures.

A further advantage of the milk-frothing device consists in that, at the beginning of drawing milk froth out of the milk-frothing device, i.e. when the flow rate of the milk flow is gradually increased from 0, a gentle outlet of milk froth can be observed and not, for example, an abrupt, sometimes explosive, outlet, as can frequently be observed in previously known milk-frothing devices. In other words, the milk-frothing device according to the invention ensures that milk froth flows uniformly, that is to say with a constant delivery rate, out of the milk-frothing device even in the event of a very low delivery rate.

For this purpose, the milk-frothing device can have a milk supply and an air supply that are configured in such a manner that the air together with the milk can pass, in particular simultaneously, through the variable opening cross section as a milk and air flow. The air flow and the milk flow can therefore thus form the milk and air flow. For this purpose, the air flow can still be combined with the milk flow upstream of the variable opening cross section, for example at an opening point at which the air supply opens into the milk supply.

Furthermore, the air flow can at least partially delimit the milk flow in the region of the variable opening cross section. In other words, the air flow can form a common fluidic boundary surface with the milk flow in the region of the variable opening cross section. Via said boundary surface, the air flow can transmit fluidic frictional forces to the milk flow such that a fluidic coupling is obtained between the milk flow and the air flow. Owing to the coupling, an increase/decrease of the air flow brings about an increase/decrease of the milk flow, and vice versa.

The variable opening cross section can accordingly be specifically dimensioned in such a manner that an adjustment of the variable opening cross section adjusts both the milk flow and the air flow, in particular simultaneously.

The effect which can be achieved in particular by such a refinement is that the air and the milk can always flow jointly, in particular simultaneously, through the variable opening cross section. This can preferably take place in such a manner that breaking off and/or pulsating of the milk flow can be prevented. Accordingly, by adjustment of the variable opening cross section, the air flow can thus be adjustable synchronously with and/or in line with the milk flow. As already mentioned at the beginning, such an adjustment according to the invention can preferably take place with an additional active regulation of the air flow being dispensed with. This is because the milk-frothing device can thereby be configured in a structurally simple manner and thus manufactured cost-effectively.

For a uniform production of fine-pored milk froth, it is particularly advantageous if the variable opening cross section of an admixing opening for air and milk that opens into the mixing chamber is upstream (in the flow direction). This is because thorough mixing of the air with the milk can thereby already take place prior to entry into the actual mixing chamber, in which the actual frothing process proceeds with the aid of steam. Thus, in particular the previously explained milk and air flow can be guided through the admixing opening into the mixing chamber.

The quality of the milk froth can be increased further if the milk-frothing device is structurally configured in such a manner that the milk and air flow is guided upstream of said admixing opening through an intake chamber which is upstream of the mixing chamber. For this purpose, the milk and air flow can be guided by means of a milk and air feed line into the mixing chamber. This milk and air feed line can comprise said intake chamber. Prior thorough mixing of the milk and of the air can take place in the intake chamber. In addition, in the intake chamber, the milk and air flow can be aligned with a steam flow output by the steam nozzle of the milk-frothing device, as will be explained in more detail.

From all of the statements made previously, it is apparent that, according to these refinements, it is preferred for the milk to be mixed with the air before the latter comes into contact with the steam. In other words, combining of the milk with the air in the milk-frothing device can thus take place upstream of said steam nozzle.

This steam nozzle of the milk-frothing device can preferably be shaped in particular in such a manner that a steam flow can be generated, causing a negative pressure on the basis of the Venturi effect. With the aid of said negative pressure, the milk and air flow can be delivered or can be deliverable into the mixing chamber preferably without the assistance of an additional pump. As a result, the entire milk-frothing device can be configured cost-effectively without a separate delivery device (for example an additional pump).

The milk-frothing device can furthermore have an additional throughflow reducer for limiting the air flow. This is expedient in particular whenever the air flow is drawn out of the ambient air.

The throughflow reducer can be realized very simply in the form of a pinhole aperture, for example with an opening diameter of <0.5 mm. It is preferred here if, in addition to the throughflow reducer, a lip seal is provided for preventing a flowback of milk. This lip seal can ideally be downstream of the throughflow reducer in the air flow direction in order to prevent milk from flowing through the throughflow reducer.

In all of the previous refinements, it is basically preferred if the opening cross section can be varied at least in a stepwise manner, but preferably continuously. This is because, in this case, a throughflow of the milk and air flow through the variable opening cross section is adjustable at least in a stepwise manner, but preferably continuously. The temperature of the milk froth can thereby be adjusted very precisely individually depending on personal requirements.

According to a preferred refinement, the opening cross section can be changeable by rotation of a regulating body about a regulating axis. For this purpose, the variable opening cross section can preferably be realized by means of a surface channel of variable depth on the regulating body. This surface channel which can primarily guide the milk flow can be configured preferably on the outer circumferential side, i.e. in particular on an outer circumference of the regulating body.

Furthermore, it can be provided in this refinement that the air is guided to the variable opening cross section by means of an air surface channel likewise formed on the regulating body. The air surface channel preferably opens here into the previously explained surface channel. In other words, the air surface channel and the surface channel (provided for the milk flow) can thus be brought together at an opening point. In this case, air and milk thus flow together through said surface channel downstream of said opening point. The variable opening cross section can be formed here at the opening point or in the surface channel downstream of the opening point.

According to a further particularly advantageous refinement, it can also be provided that said air flow is not obtained, as customary, from the ambient air, but rather from an air supply which can be switched off. In other words, the milk-frothing device can therefore have an air switching-off device with which the air flow can be switched on and off.

If the air flow is switched off by means of the air switching-off device, air can no longer pass into the mixing chamber while the milk flow continues to be deliverable into the mixing chamber. Thus, when the air flow is switched off, a pure milk flow can be delivered by the milk-frothing device. Said pure milk flow which cannot contain any air whatsoever can be heated here with the aid of the steam nozzle. By means of such a refinement, it is possible with the milk-frothing device according to the invention to deliver a heated milk flow of up to 80° C.

It is therefore advantageous that the air supply or the air flow into the mixing chamber can be switched on and off with the aid of the switching-off device. This can be realized in particular automatically by a corresponding machine controller. For example, the switching-off device can be configured as an electrically controllable switching-off valve. A separate line thus no longer has to be provided for delivering hot milk, but rather both milk froth and hot milk can be deliverable from the milk-frothing device according to the invention.

In order to avoid the aforementioned disadvantages, it can also be provided that the air flows into the mixing chamber through the variable opening cross section. With this method, all of the advantages which have already been explained with respect to the milk-frothing device can be realized.

The previously described methods can also have further advantageous features in further refinements.

For example, the air can form an air flow which flows together with, in particular simultaneously with, the milk flow as a milk and air flow through the variable opening cross section. The milk and air flow can be adjusted or regulated here in particular by adjusting the variable opening cross section. Furthermore, in the region of the variable opening cross section, the milk flow can be at least partially delimited by the air flow, as has already been explained previously.

By adjusting the variable opening cross section, both the air flow and the milk flow can be adjusted according to the method. This can take place in particular simultaneously and/or in parallel, and therefore, for example, the air flow is automatically reduced when the milk flow is reduced and/or the air flow is automatically increased when the milk flow is increased.

Furthermore, this adjustment can preferably take place with an additional active regulation of the air flow being dispensed with.

Furthermore, it is possible for air and milk to always flow together, in particular simultaneously, through the variable opening cross section, preferably without the milk flow breaking off and/or pulsating.

The steam flow can preferably be produced by means of a steam nozzle. In this case, the milk and the air can be delivered into the mixing chamber exclusively on the basis of a negative pressure generated by the steam nozzle of the milk-frothing device on the basis of the Venturi effect, preferably without assistance of a pump. This delivery can preferably take place by means of a common milk and air feed line which ends in an admixing opening for air and milk that, for its part, opens into the mixing chamber.

A negative pressure can be generated by means of the steam nozzle in the mixing chamber, the negative pressure sucking up the milk together with the air from the common milk and air feed line. The common milk and air feed line can preferably comprise an intake chamber which is upstream of the mixing chamber in the milk flow direction and in which the milk and air flow can be aligned with the steam flow before the milk and air flow enters the mixing chamber through the admixing opening.

According to a preferred refinement of the method, the temperature of the milk froth can be increased by the milk and air flow being reduced by a reduction of the opening cross section. In this connection, in particular the steam flow can be kept constant or increased. Furthermore, by means of a reduction of the opening cross section, both the air flow and the milk flow can be reduced.

Finally, the air flow can additionally be reduced by means of a throughflow reducer. This can take place in particular with a throughflow reducer in the form of a pinhole aperture (cf. the explanations above) and preferably in conjunction with a lip seal (cf. above) for preventing a flowback of milk.

The opening cross section can be changed in a stepwise manner, but preferably continuously in order thereby to adjust the milk and air flow in a stepwise manner, but preferably continuously. The temperature of the milk froth can thereby be finely regulated.

Furthermore, the opening cross section, as has already been explained previously, can be changed by rotation of a regulating body about a regulating axis. This preferably takes place by a depth, which determines the opening cross section, of a surface channel on the regulating body being changed by rotation of the regulating body.

BRIEF DESCRIPTION OF THE DRAWINGS

The invention will now be described in more detail with reference to an exemplary embodiment, but is not restricted to this exemplary embodiment. Further exemplary embodiments emerge from a combination of the features of individual or a plurality of claims with one another and/or with individual features or a plurality of features of the exemplary embodiment. In particular, embodiments of the invention can therefore be obtained from the description below of a preferred exemplary embodiment in conjunction with the general description, the claims and the drawings.

In the drawings.

DETAILED DESCRIPTION

Figure 1:
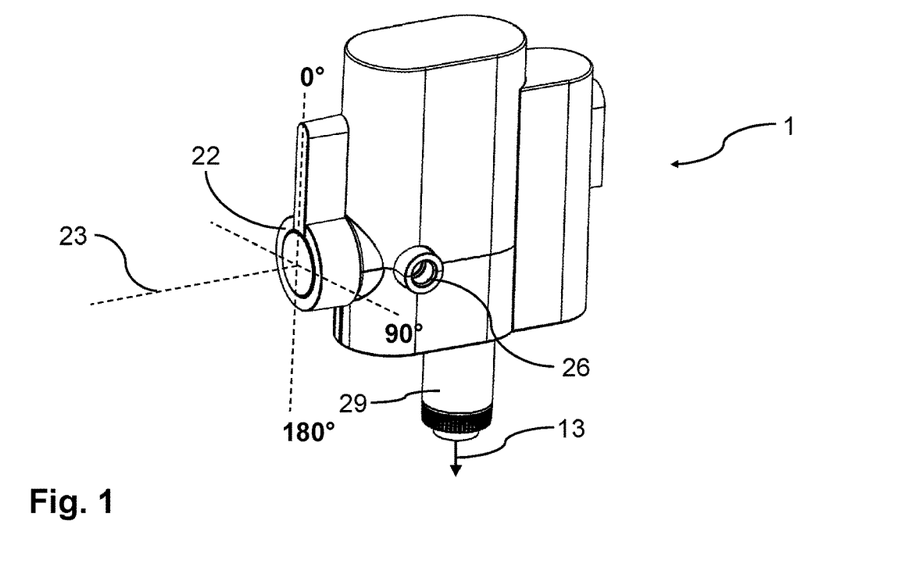
FIG. 1 shows a perspective view of a milk delivery device according to the invention.

FIG. 1 shows a milk delivery device according to the invention, denoted as a whole by 1, which is provided for use on a fully automatic coffee machine with which various coffee beverages can be provided, wherein the milk delivery device 1 conveys milk for the coffee beverages through the fully automatic coffee machine and finally into a cup.

Figure 2:
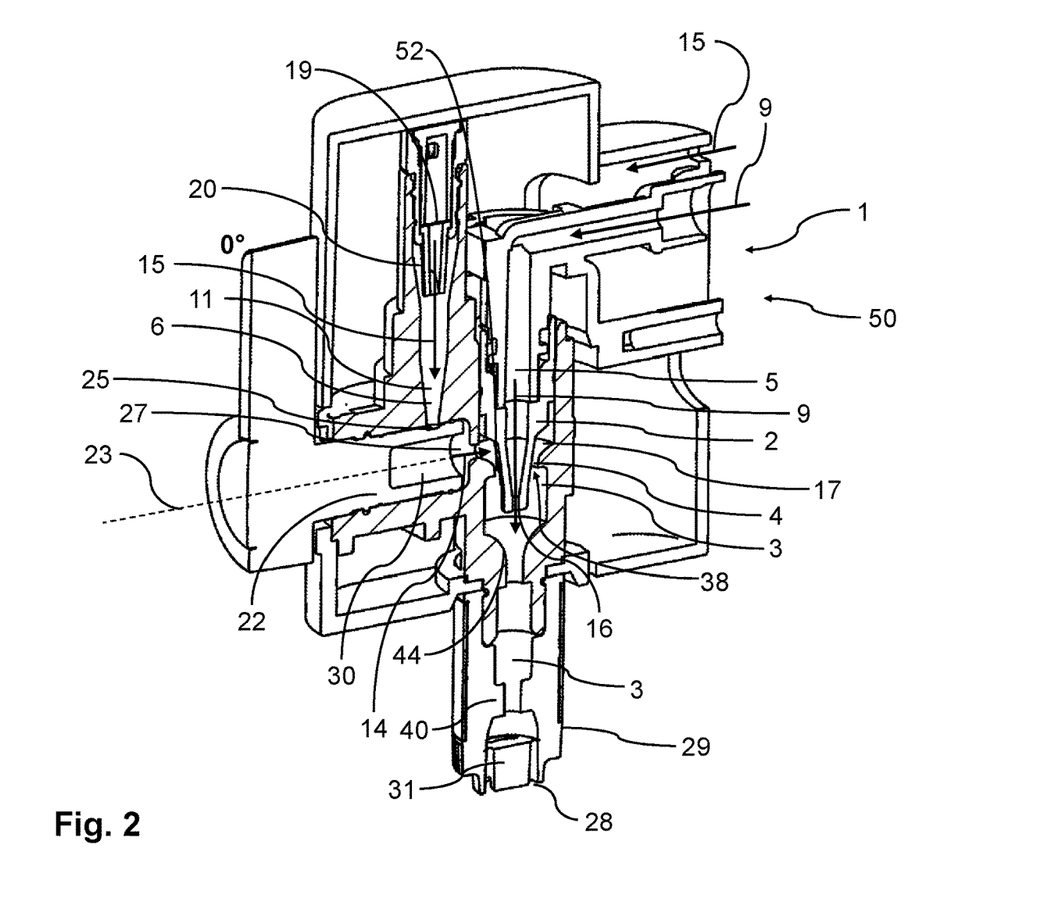
FIG. 2 shows a perspective view of a longitudinal section of the milk delivery device from FIG. 1.

As can be seen in FIG. 2, the milk delivery device 1 has a steam nozzle 2 for producing a steam flow 9, and a mixing chamber 3 which adjoins a steam outlet opening 16 of the steam nozzle 2. The delivered milk 7 is guided here as a milk flow 8 along the flow path, shown as a dashed line in FIG. 11 (and provided with reference signs 8/14) through an admixing opening 4 into the mixing chamber 3. The admixing opening 4 opens here into the mixing chamber 3 and thus defines the entry point 38.

Figure 11:
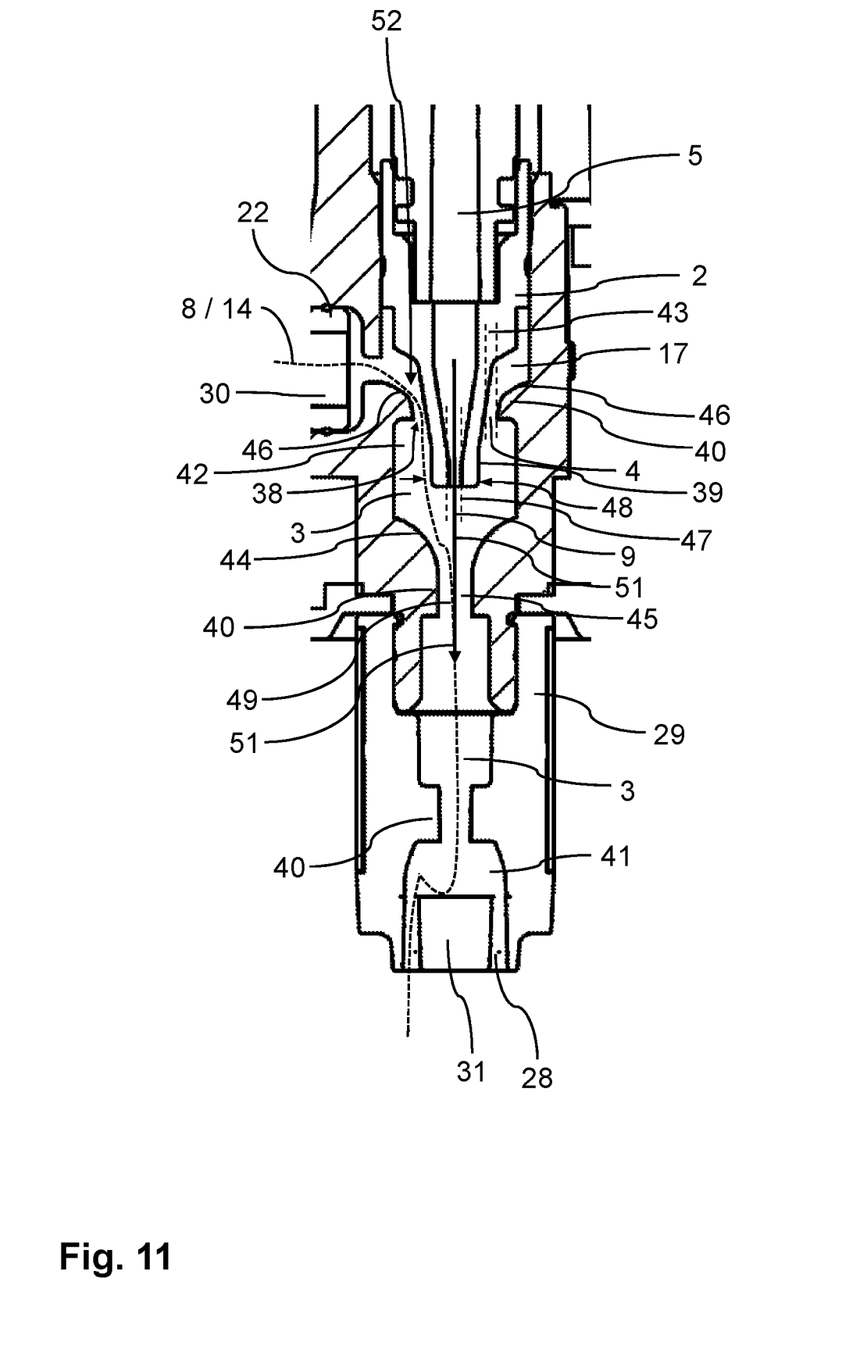
FIG. 11 shows a detailed sectional view of a mixing chamber of the milk delivery device of FIG. 1.

As can be readily seen in particular in FIGS. 2 and 11, the entry point 38 is upstream of the steam outlet opening 16, specifically with respect to the direction of the steam flow 9, which direction is illustrated in the figures with the aid of a straight arrow running through the steam outlet opening 16. The shifting upstream is dimensioned here in such a manner that the distance (vertical in the figures) that can be measured in FIG. 2 and even better in FIG. 11 between the entry point 38 and the steam outlet opening 16 is greater than the clear diameter 47 of the steam outlet opening 16, is greater than a clear width 43 of the admixing opening 4 and even is greater than an outer diameter 48 of the steam nozzle 2 at the location of the steam outlet opening 16.

This ample shifting of the entry point upstream or extension of the steam nozzle 2 (in each case in comparison to previously known devices) achieves the flow guide that is illustrated in FIG. 11 with the aid of the dashed line and in which the milk 7 is fed as a milk flow 8 in the direction 51 of the steam flow 9 (compare the arrow in FIG. 11) to the steam flow 9. As can be seen in FIG. 11, the milk flow 8 already flows here in a region 42 of the mixing chamber 3, that is upstream of the steam outlet opening 16, in the direction 51 of the steam flow 9. This is seen in particular by way of the dashed line in the region 42 where the milk flow 8 flows along an outer surface 39 of the steam nozzle 2.

It can be seen more precisely in FIG. 11, but even better in FIG. 2, that the steam nozzle 2 at the same time bounds the admixing opening 4 and therefore at the same time defines the entry point 38. This is because said admixing opening 4 is configured annularly and is arranged concentrically with respect to the steam nozzle 2, as is readily seen in the perspective view of FIG. 2 or, for example, in FIGS. 6 and 8.

The entry point 38 is formed here by a constriction 40 (cf. FIG. 3) which separates an intake chamber 17, which is upstream of the mixing chamber 3 in the flow direction of the milk flow 8, from the mixing chamber 3. The milk flow 8 flows as a milk and air flow 14 into the intake chamber 17. In other words, the milk flow 8 thus contains an air portion, the purpose of which will be explained more precisely further below.

The intake chamber 17 annularly surrounds the steam nozzle 2 (compare FIGS. 2 and 6) and forms a deflecting surface 46 that is likewise formed annularly. By means of said deflecting surface 46, the milk flow 8 flowing into the intake chamber 17 initially transversely with respect to the steam flow 9 is deflected in such a manner that the milk flow 8 already passes through the admixing opening 4 in the direction 51 of the steam flow 9, which can readily be seen with reference to the dashed line in FIG. 11.

More precisely, the milk flow 8 already flows in the intake chamber 17 around the steam nozzle 2 and then enters as a casing flow through the annular admixing opening 4 into the mixing chamber 3. Subsequently, the milk flow 8 as a casing flow converges continuously with the steam flow 9 and encases the latter in the form of a casing until it is combined therewith to form a steam and milk flow 49 (cf. FIG. 11).

This combining takes place more precisely with the aid of a collecting funnel 44 (cf. FIGS. 6 and 11) which is formed in the mixing chamber 3 and which collects and combines the milk 7 and the steam 5. The collecting funnel 44 is constricted here in the direction 51 of the steam flow 9, with said collecting funnel being oriented precisely centrally with respect to the steam outlet opening 16 (cf. FIG. 11).

By means of this further constriction 40, the mixing chamber 3 is separated from a downstream atomization chamber 41, wherein at the same time an acceleration section 45 for accelerating the steam and milk flow 49 is formed by the constriction 40 (cf. FIG. 11). The steam and milk flow 49 thereby flows at high speed into the downstream atomization chamber 41 and impacts there against a centrally arranged impact body 31, as a result of which the steam and milk flow 49 is turbulently swirled and therefore heat is transmitted from the hot steam 5 to the milk 7 to be heated.

As a result, the previously described device 1 can deliver milk at temperatures of up to 80° C. from the milk outlet opening 28 (cf. FIG. 3) without, despite a very low delivery rate, the milk flow 8 breaking off.

As will be explained in detail further below, the milk delivery device 1 explained previously with reference to the figures can also be used as a milk-frothing device 50. In this case, the milk delivery device 1 delivers a milk flow 8 containing an air portion into the mixing chamber 3. If said milk and air flow 14 is swirled with the steam 5 in the atomization chamber 41, milk froth is produced.

In such a case, it is very particularly advantageous if the milk delivery device 1 has a variable opening cross section 10 through which an air flow 14 can be conducted, preferably simultaneously with the milk flow 8. This is because, as will be explained in more detail, it can thereby be ensured, even at low delivery rates, that the milk flow 8 does not break off because the air flow 14 gains the upper hand.

According to a further aspect of the invention, milk froth can also be conveyed with the milk delivery device 1 shown in the figures. That is to say, the milk delivery device 1 can be used in particular as a milk-frothing device 50 which can be used in said fully automatic coffee machine in order to provide coffee beverages which include milk froth, i.e., for example, cappuccino.

As can readily be seen in FIGS. 2 and 3, for this purpose the milk-frothing device 50 has a steam nozzle 2 with which a steam flow 9 can be produced which exits from a steam outlet opening 16 and flows into a mixing chamber 3 downstream of the steam nozzle 2. For this purpose, a steam supply connection 32 is also provided, from which steam 5 passes into the steam nozzle 2.

With the aid of the steam flow 9, both milk 7 and air 6 can be delivered into the mixing chamber 3 with the aid of the Venturi effect in order to froth the milk 7 and the air 6 there to form a stable milk froth 13. In order to configure the milk-frothing device 50 in a structurally simple manner, an additional pump has been omitted here, and therefore the milk 7 and the air 6 are delivered as a milk and air flow 14 into the mixing chamber 3 exclusively because of the negative pressure generated by the steam nozzle 2.

In order to froth the milk 7, an impact body 31 is provided in the mixing chamber 3, at which impact body turbulent swirling of the milk 7 and of the air 6 occurs, such that fine-pored milk froth 13 arises which then flows out of a milk froth outlet opening 28 of the discharge module 29, which is shown in FIGS. 2 and 3.

The milk 7 is supplied here to the milk-frothing device 50 via a milk supply connection 26 and an adjoining milk supply 12, which can be seen in FIG. 1, and therefore a milk flow 8 (cf. FIG. 6) is guided into the mixing chamber 3. Furthermore, a corresponding air supply 11 is also provided with which an air flow 15 is guided into the mixing chamber 3, wherein the air flow 15 is obtained from the ambient air, as can be seen with reference to FIGS. 2 and 3.

The milk-frothing device 50 furthermore has a regulating body 22 which is mounted rotatably about a regulating axis 23. A variable opening cross section 10 which reduces or adjusts a throughflow rate of the milk flow 8 is adjustable with the regulating body 22. As will be explained more precisely, a flow rate of the milk flow 8 can be precisely and continuously adjusted here by rotation of the regulating body 22.

Since the steam nozzle 2 substantially produces a constant steam flow 9, the temperature of the emerging milk froth 13 can be adjusted with the aid of the regulating body 22. This is because as soon as the flow rate of the milk flow 8 is reduced while the flow rate of the steam flow 9 remains substantially constant, the temperature of the milk froth 13 correspondingly increases. This means that particularly high temperatures of the milk froth 13 are achieved precisely when the flow rate of the milk flow 8 is at its lowest.

In order now in such a situation to prevent the milk flow 8 from breaking off and only air 6 from flowing into the mixing chamber 3, according to the invention the air flow 15 is guided through the variable opening cross section 10 into the mixing chamber 3.

Figure 10:
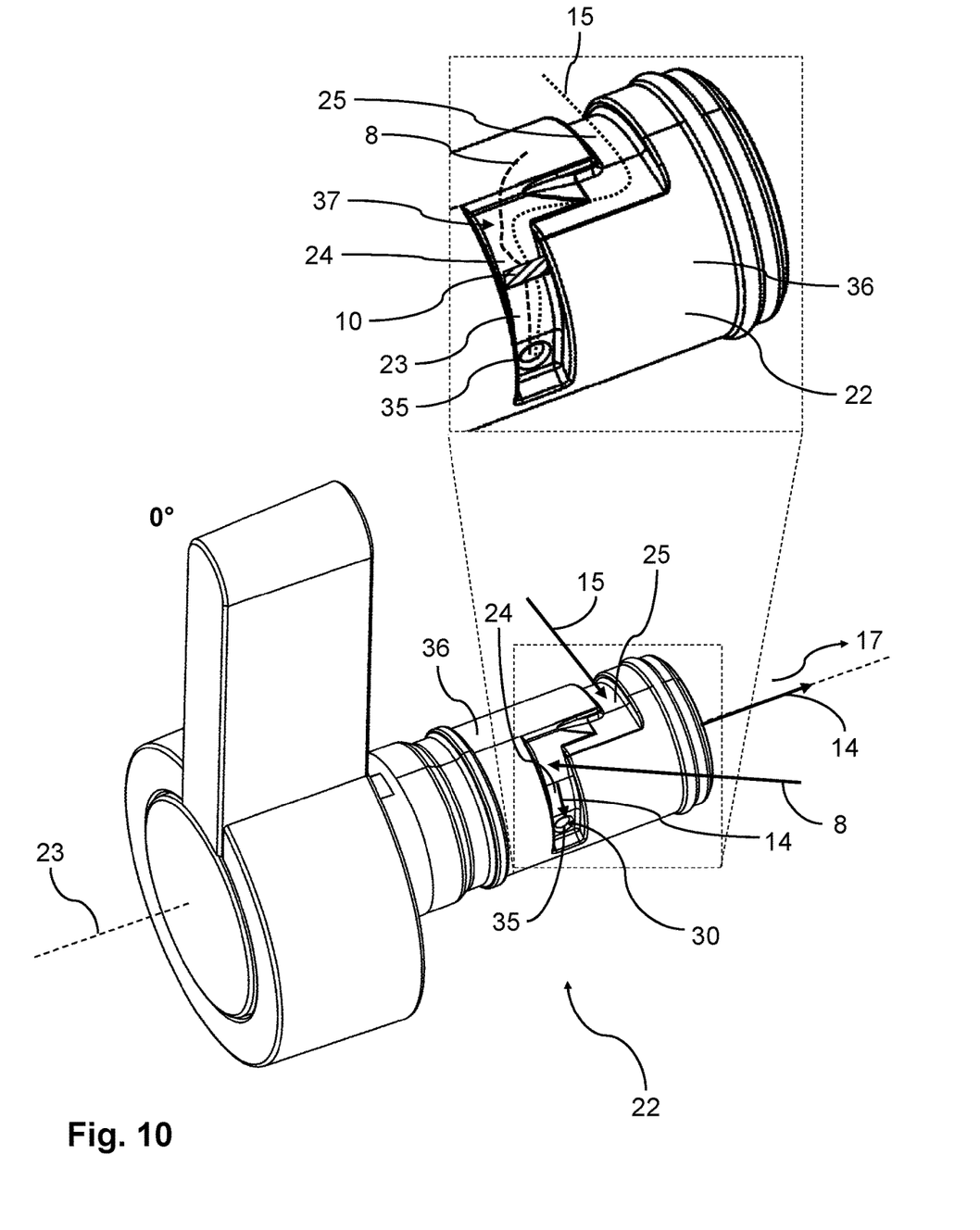
FIG. 10 shows a perspective detailed view of the regulating body of the milk delivery device from FIG. 1 in the 0° position shown in FIG. 1 and FIG. 6.

As the detailed view of the regulating body 22 according to FIG. 10 shows, the regulating body 22 has for this purpose a first surface channel 24 for guiding the milk 7 or the milk flow 8 and an air surface channel 25 for guiding the air 6 or the air flow 15. These two surface channels 24, 25 are each formed on the outer circumferential side in a circumferential outer surface or in an outer contour 36 of the regulating body 22. The circumferential outer surface/outer contour 36 of the regulating body 22 is formed cylindrically here in order to permit a rotation of the regulating body 22, as the detailed view of FIG. 10 shows.

Figure 6:
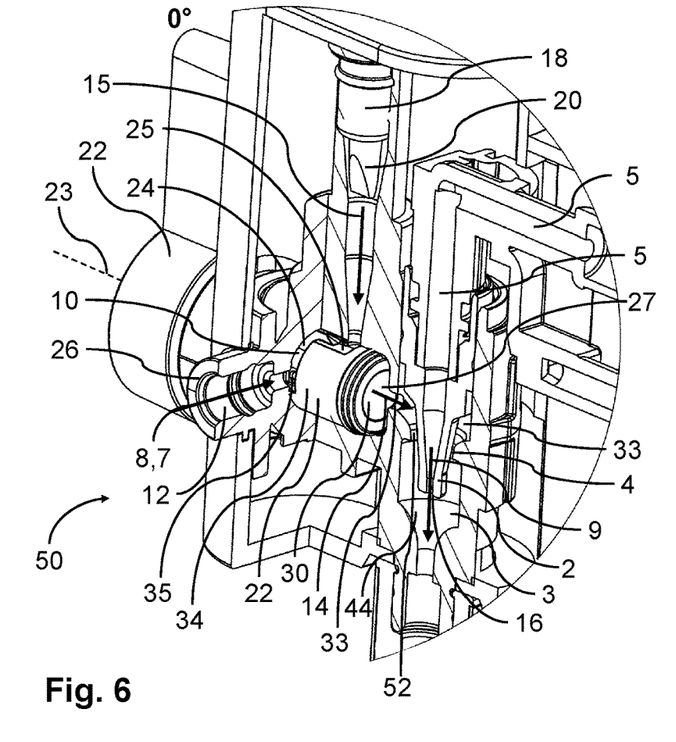
FIG. 6 shows a perspective detailed view of a partial vertical section through the milk delivery device of FIG. 1 along the section line shown in FIG. 5.
Figure 8:
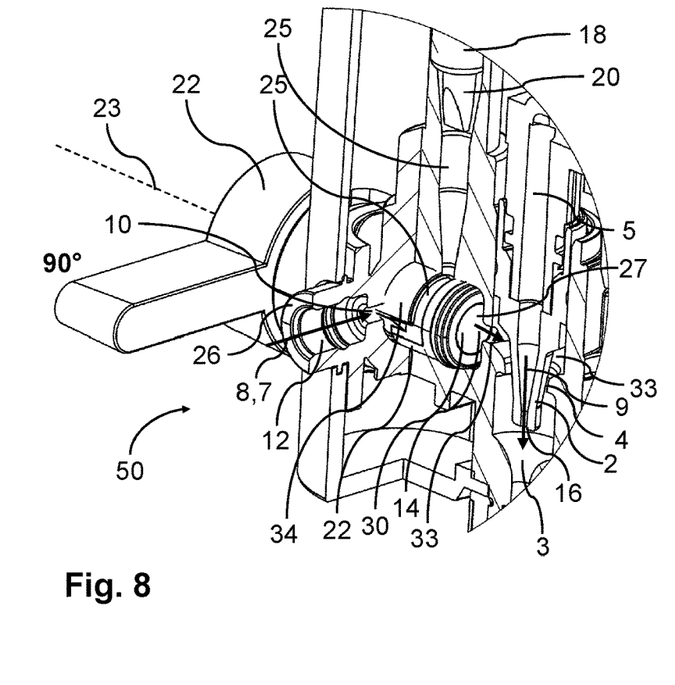
FIG. 8 shows the detailed view from FIG. 6 after rotation of the regulating body of the milk delivery device by 90° in the clockwise direction.

It is apparent with reference to the detailed views according to FIGS. 6 and 8 that the regulating body 22 is mounted in a sealing manner in a regulating body receptacle 34 formed so as to correspond to the regulating body 22. An inner surface of the regulating body receptacle 34 with the respective surface channel 24, 25 defines a respective throughflow cross section which at the same time determines a flow rate of the milk flow 8 or of the air flow 15.

As the detailed view of FIG. 10 shows, a channel depth of the surface channel 24 is configured so as to be changeable in the circumferential direction. The respective channel depth of the surface channel 24 together with the regulating body receptacle 34 determines the variable opening cross section 10 through which both the air flow 15 and the milk flow 8 are guided, as can be seen with reference to the dashed and dotted lines in the detailed view of FIG. 10.

For this purpose, the air surface channel 25 opens into the surface channel 24, and therefore at the opening point 37 shown in FIG. 10, the air supply 11 and the milk supply 12 are precisely brought together, specifically still upstream of the variable opening cross section 10. In other words, the air 6 or the air flow 15 is thus guided with the aid of the air surface channel 25 to the opening point 37 and from there to the variable opening cross section 10.

In other words, the cross-sectional area of the opening cross section 10 thus changes as soon as the regulating body 22 is rotated. This change takes place continuously, and therefore the opening cross section 10 can be changed continuously by rotation of the regulating body 22. Consequently, a flow rate of the milk and air flow 14 through the variable opening cross section 10 can thereby be continuously changed.

Figure 7:
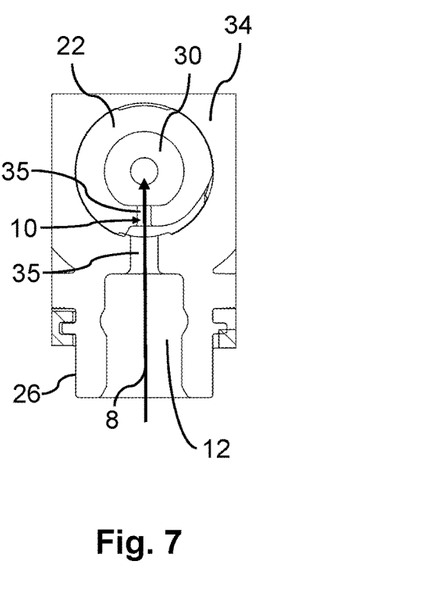
FIG. 7 shows a top view from above of a horizontal section through the regulating body in the position according to FIG. 6.

In the 0° position of the regulating body 22 that is shown in FIGS. 6 and 7, the variable opening cross section 10 is determined here precisely by a through opening 35 which opens into a chamber 30 in the interior of the regulating body 22 (cf. FIG. 7 together with FIG. 3). In this position of the regulating body 22, both the air flow 15 and the milk flow 8 thus flow through the inflow opening 33, which acts as the variable opening cross section 10, into the chamber 30 and from there as a milk and air flow 14 through an inflow opening 33 into an intake chamber 17 and from there through an admixing opening 4 into the mixing chamber 3 (cf. FIGS. 6 and 8).

Figure 9:
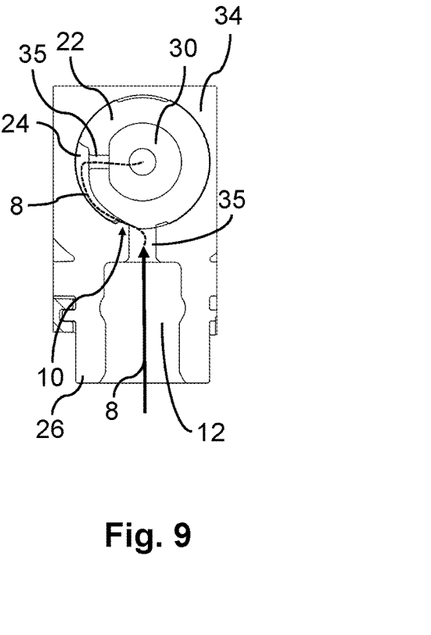
FIG. 9 shows a top view from above of a horizontal section through the regulating body in the position according to FIG. 8, in analogy to FIG. 7.

By contrast, in the 90° position of the regulating body 22 that is shown in FIGS. 8 and 9, both the air flow 15 and the milk flow 8 flow in the surface channel 24 initially along the circumference of the regulating body 22, then through the variable opening cross section 10, illustrated as a hatched area in FIG. 10, and only then through the through opening 35 into the chamber 30 in order to pass from there into the intake chamber 17 and finally into the mixing chamber 3. In this situation, the cross-sectional area, which is illustrated as a hatched area in FIG. 10, is thus precisely the determining feature for the throughflow of the milk and air flow 14 and therefore acts as variable opening cross section 10 within the context of the invention.

In both situations (FIG. 6/FIG. 8), the air 6 together and simultaneously with the milk 7 passes through the variable opening cross section 10 as a milk and air flow 14, wherein the air flow 15 mentioned at the beginning and the milk flow 8 mentioned at the beginning form the milk and air flow 14.

As is easily conceivable with reference to the detailed view of FIG. 10, the two fluids, i.e. the milk 7 and the air 6, flow next to each other here through the variable opening cross section 10 and form a common fluidic boundary surface via which the two fluids interact with each other. This has the result that, in the region of the variable opening cross section 10, the air flow 15 at least partially bounds the milk flow 8. The remaining boundary is provided here by the walls of the surface channel 24 and by the inner surface of the regulating body receptacle 34.

In this connection, the variable opening cross section 10 that is determined by the variable channel depth of the surface channel 24 is dimensioned precisely in such a manner that an adjustment of the variable opening cross section 10 adjusts both the milk flow 8 and also the air flow 15 simultaneously and in particular in parallel by rotation of the regulating body 22. This means that, in the event that the variable opening cross section 10 is reduced from the 0° position shown in FIG. 6 into the 90° position shown in FIG. 8 by rotation of the regulating body 22, both a flow rate of the milk flow 8 and also at the same time a flow rate of the air flow 15 is reduced. Therefore, the air flow 15 is thus automatically throttled as soon as the milk flow 8 is reduced, for example in order to achieve a high temperature of the emerging milk froth 13.

Due to the fluidic coupling between the milk flow 8 and the air flow 15, said coupling arising by means of the common fluidic boundary surface, it is virtually no longer possible for the milk flow 8 to break off.

As can be readily seen in particular in the longitudinal sectional view of FIG. 3 (in conjunction with FIG. 3), the variable opening cross section 10 is precisely upstream of the admixing opening 4, through which air 6 and milk 7 pass into the mixing chamber 3, with respect to the flow direction of the milk and air flow 14. Furthermore, it can be seen that the milk and air flow 14 is still guided upstream of the admixing opening 4 through the intake chamber 17, which is upstream of the mixing chamber 3.

The through opening 35, the chamber 30, the inflow opening 33, the intake chamber 17 and the admixing opening 4 thus form a milk and air feed line 21 which guides the milk and air flow 14 from the variable opening cross section 10 into the mixing chamber 3.

As can be seen, for example, in FIGS. 2, 3 and 6, the air 6 first of all flows through a throughflow reducer 18 in the form of a pinhole aperture 19 and then through a lip seal 20. While the pinhole aperture 19 reduces a flow rate of the air flow 15, the lip seal serves to prevent a possible backflow of the milk 7 in the direction of the pinhole aperture 19.

The figures do not show a further possible refinement of the milk-frothing device 50, in which the air flow 15, which flows into the mixing chamber 3 through the variable opening cross section 10, can be switched on or off by means of an air switching-off device in the form of an electrically or manually activatable blocking valve. If the air switching-off device is activated by the fully automatic coffee machine, no more air 6 can flow into the mixing chamber 3, but milk 7 can continue to flow through the variable opening cross section 10 into the mixing chamber 3. In this case, the milk-frothing device 50 therefore specifically does not deliver any milk froth 13 through the milk froth outlet opening 28, shown in FIG. 3, of the discharge module 29, but rather delivers milk 7 heated by the steam 5. In such a refinement, both milk froth 13 and hot milk 7 can therefore be output by the milk-frothing device 50.

In summary, the invention according to a first aspect for a milk delivery device 1, which delivers milk 7 on the basis of the Venturi effect with the aid of a steam flow 9 output by a steam nozzle 2, proposes, by means of corresponding orientation of an admixing opening 4 and optionally with the aid of deflecting surfaces 46, to allow a milk flow 8 which is sucked up by a steam flow 9 to flow tangentially onto the steam flow 9 in order thereby to still be able to ensure delivery of the milk flow 8 as far as possible without disturbance, even at very low flow rates of the milk flow 8. For this purpose, even before the milk flow 8 enters into contact with the steam flow 9, the milk flow 8 is oriented in the direction 51 of the steam flow 9.

According to a second aspect, the invention also aims to improve the quality of a milk froth 13 which is produced by means of the milk delivery device 1, which is used for this purpose as a milk-frothing device 50. For this purpose, the milk delivery device 1 or the milk-frothing device 50 has a mixing chamber 3 in which air 6 and milk 7 can be frothed by means of a steam flow 9 to form the milk froth 13. It is proposed that a respective flow rate of an air flow 15 and a milk flow 8, which each flow into the mixing chamber 3, is adjusted by the fact that the air 6 and the milk 7 always flow together into the mixing chamber 3 through an adjustable, variable opening cross section 10 which acts as a flow rate reducer or as a throttle for the air flow 15 and the milk flow 8.

LIST OF REFERENCE SIGNS

1 Milk delivery device
2 Steam nozzle
3 Mixing chamber
4 Admixing opening
5 Steam
6 Air
7 Milk
8 Milk flow
9 Steam flow
10 Variable opening cross section
11 Air supply
12 Milk supply
13 Milk froth
14 Milk and air flow
15 Air flow
16 Steam outlet opening
17 Intake chamber
18 Throughflow reducer (for 15)
19 Pinhole aperture
20 Lip seal
21 Milk and air feed line
22 Regulating body
23 Regulating axis
24 Surface channel (for 7/8)
25 Air surface channel (for 6/15)
26 Milk supply connection
27 Milk and air feed line
28 Milk outlet opening/milk froth outlet opening
29 Discharge module
30 Chamber
31 Impact body
32 Steam supply connection
33 Inflow opening
34 Regulating body receptacle
35 Through opening
36 Outer contour (of 22)
37 Opening point
38 Entry point (for 7 into 3)
39 Outer surface (of 2)
40 Constriction
41 Atomization chamber
42 Region (of 3)
43 Clear width (of 4)
44 Collecting funnel
45 Acceleration section
46 Deflecting surface
47 Clear diameter (of 16)
48 Outer diameter (of 2)
49 Steam and milk flow
50 Milk-frothing device
51 Direction of the steam flow
52 Constriction section

The invention claimed is:

1. A milk delivery device (1), comprising:
 a steam nozzle (2) for generating a steam flow (9) from a steam outlet opening (16);
 a mixing chamber (3) adjoining the steam outlet opening (16) of the steam nozzle (2), wherein milk (7) is adapted to be guided at an entry point (38) into the mixing chamber (3), and the entry point (38) is upstream with respect to a direction (51) of the steam flow (9) of the steam outlet opening (16);
 the entry point (38) is formed as a constriction (40), and the constriction (40) forms a structural boundary which separates an intake chamber (17) upstream of the mixing chamber (3) from the mixing chamber (3);
 the mixing chamber (3) and the intake chamber (17) are arranged annularly around the steam nozzle (2), and
 the mixing chamber (3) has a greater opening cross section than the constriction (40);
 wherein the milk (7) is delivered based on the Venturi effect created by the steam nozzle (2) which includes a flow cross-section that is constricted at the steam outlet opening (16).

2. The milk delivery device (1) according to claim 1, further comprising an admixing opening (4) that defines the entry point (38) and opens into the mixing chamber (3), the admixing opening (4) is at least one of oriented or shaped such that the milk (7) is adapted to be fed as a milk flow (8) in the direction of the steam flow (9) to the steam flow (9), such that, in a region (42) of the mixing chamber (3) upstream of the steam outlet opening (16), the milk flow (8) is adapted to flow in the direction of the steam flow (9).

3. The milk delivery device (1) according to claim 1, wherein an outer surface (39) of the steam nozzle (2) bounds the entry point (38) at least in sections.

4. The milk delivery device (1) according to claim 1, wherein at least one of the constriction is formed at least in sections by a constriction section (52) having a constant opening cross section, or the constriction (40) separates the intake chamber (17) upstream of the mixing chamber (3) from the mixing chamber (3).

5. The milk delivery device (1) according to claim 4, wherein the intake chamber (17) annularly surrounds the steam nozzle (2), and at least one of the intake chamber (17) or the steam nozzle (2) has a deflecting surface (46) configured for deflecting the milk flow (8) in the direction of the steam flow (9), such that the milk flow (8) is adapted to pass through the admixing opening (4) in the direction of the steam flow (9).

6. The milk delivery device (1) according to claim 1, further comprising a flow guide of a milk flow (8) or of a milk and air flow (14) upstream of the entry point, wherein the flow guide at least one of has a maximum change in direction of at most 120 degrees or is free of switchbacks.

7. The milk delivery device (1) according to claim 1, wherein a distance between the entry point (38) and the steam outlet opening (16) is greater than at least one of a clear diameter (47) of the steam outlet opening (16), a clear width (43) of the admixing opening (4), or an outer diameter (48) of the steam nozzle (2) at a location of the steam outlet opening (16).

8. The milk delivery device (1) according to claim 1, further comprising an atomization chamber (41) downstream of the mixing chamber (3) in the steam flow direction, said atomization chamber at least one of being separated from the mixing chamber (3) by the constriction (40) or having an impact body (31) for atomizing milk (7).

9. The milk delivery device (1) according to claim 8, further comprising an acceleration section (45) configured for accelerating a steam and milk mixture formed between the mixing chamber (3) and the atomization chamber (41).

10. The milk delivery device (1) according to claim 1, wherein the mixing chamber (3) has a collecting funnel (44) which is configured to collect and combine the steam flow (9) and the milk flow (8).

11. The milk delivery device (1) according to claim 10, wherein the collecting funnel (44) is at least one of aligned with the steam outlet opening (16) or is constricted in the steam flow direction.

12. The milk delivery device (1) according to claim 1, wherein the milk delivery device comprises a milk-frothing device (50), wherein a milk flow (8) which is adapted to be delivered by the milk delivery device (1) to flow into the mixing chamber (3) at the entry point (38) is adjustable upstream of the entry point (38) by a variable opening cross section (10).

13. The milk delivery device (1) according to claim 12, further comprising an air supply (11) configured such that, at a same time as the milk flow (8), an air flow (14) is adapted to be conducted through the variable opening cross section (10) such that the milk and air flow (14) is guided at the entry point (38) into the mixing chamber (3).

14. The milk delivery device (1) according to claim 13, wherein the milk flow (8) is adapted to have an air portion and is adapted to pass as the milk and air flow (14) into the mixing chamber (3) such that a steam and milk and air mixture is adapted to be formed in the mixing chamber (3).

15. A method for delivering milk (7), the method comprising:
providing a steam nozzle (2) for generating a steam flow (9) from a steam outlet opening (16);
providing a mixing chamber (3) adjoining the steam outlet opening (16) of the steam nozzle (2), and orienting the milk (7) as a milk flow (8) along the steam flow (9) using a milk delivery device, wherein the milk (7) is adapted to be guided at an entry point (38) into the mixing chamber (3), and the entry point (38) is upstream with respect to a direction (51) of the steam flow (9) of the steam outlet opening (16);
mixing the milk (7) with air (6) beforehand in an intake chamber (17), which is upstream of the mixing chamber (3) and is separated from the mixing chamber (3) by the entry point (38) which is formed as a constriction (40) forming a structural boundary, to form a milk and air flow (14) before the milk and air flow (14) is subsequently combined in the mixing chamber (3) with the steam flow (9); and
the milk and air flow (14) before entering the mixing chamber (3) flowing through the constriction (40), the opening cross section of which is smaller than that of the mixing chamber (3), such that a steam and milk mixture is prevented from flowing back out of the mixing chamber (3) into the upstream intake chamber (17);
wherein the milk (7) is delivered based on the Venturi effect created by the steam nozzle (2) which includes a flow cross-section that is constricted at the steam outlet opening (16).

16. The method according to claim 15, wherein at least one of:
(a) the milk flow (8) is oriented by a deflecting surface (46) in the intake chamber (17) upstream of the mixing chamber (3),
(b) the milk flow (8) flows concentrically with respect to the steam nozzle (2) into said mixing chamber (3), or
(c) the milk flow (8) in a region (42) that is upstream of a steam outlet opening (16) of the steam nozzle (2) flows in the direction (51) of the steam flow (9) along an outer surface (39) of the steam nozzle (2).

17. The method according to claim 15, wherein at least one of:
(a) the milk flow (8) flows transversely with respect to the direction of the steam flow (9) into the intake chamber (17),
(b) the milk flow (8) is combined with the steam flow (9) in the mixing chamber (3) by a collecting funnel (44), or
(c) the milk flow (8) has an air portion for forming a steam and milk and air mixture.

18. The method of claim 15, wherein the milk flow (8) is oriented in the direction (51) of the steam flow (9) using an admixing opening (4), which is upstream of a steam outlet opening (16) of the steam nozzle (2).

19. The method of claim 15, wherein the milk flow (8) already flows in the direction of the steam flow (9) when said milk flow flows into the mixing chamber (3).

* * * * *